United States Patent
Paulsen et al.

(10) Patent No.: US 10,069,140 B2
(45) Date of Patent: Sep. 4, 2018

(54) BIMODAL LITHIUM TRANSITION METAL BASED OXIDE POWDER FOR USE IN A RECHARGEABLE BATTERY

(71) Applicants: UMICORE, Brussels (BE); UMICORE KOREA LTD., Cheonam, Chungnam (KR)

(72) Inventors: Jens Paulsen, Daejeon (KR); HyeYun Yang, Asan (KR)

(73) Assignees: Umicore, Brussels (BE); Umicore Korea, Ltd., Chungnam (KR)

( * ) Notice: Subject to any disclaimer, the term of this patent is extended or adjusted under 35 U.S.C. 154(b) by 0 days.

(21) Appl. No.: 14/650,974

(22) PCT Filed: Nov. 28, 2013

(86) PCT No.: PCT/EP2013/074961
§ 371 (c)(1),
(2) Date: Jun. 10, 2015

(87) PCT Pub. No.: WO2014/090584
PCT Pub. Date: Jun. 19, 2014

(65) Prior Publication Data
US 2015/0311512 A1    Oct. 29, 2015

(30) Foreign Application Priority Data
Dec. 14, 2012  (EP) ..................... 12197350

(51) Int. Cl.
*H01M 4/36* (2006.01)
*H01M 4/54* (2006.01)
*H01M 4/525* (2010.01)
*H01M 4/485* (2010.01)
*H01M 4/505* (2010.01)
*H01M 4/48* (2010.01)
*C01G 51/00* (2006.01)
*C01G 53/00* (2006.01)
*H01M 4/131* (2010.01)
*H01M 10/052* (2010.01)
*H01M 10/0525* (2010.01)
*H01M 4/02* (2006.01)

(52) U.S. Cl.
CPC ............ *H01M 4/366* (2013.01); *C01G 51/42* (2013.01); *C01G 53/44* (2013.01); *H01M 4/131* (2013.01); *H01M 4/364* (2013.01); *H01M 4/48* (2013.01); *H01M 4/485* (2013.01); *H01M 4/505* (2013.01); *H01M 4/525* (2013.01); *H01M 4/54* (2013.01); *H01M 10/052* (2013.01); *C01P 2002/60* (2013.01); *C01P 2004/03* (2013.01); *C01P 2004/61* (2013.01); *C01P 2006/10* (2013.01); *C01P 2006/11* (2013.01); *C01P 2006/12* (2013.01); *C01P 2006/40* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2006/0204845 A1* 9/2006 Chang .................. H01M 4/364
                                                        429/209
2010/0112445 A1    5/2010 Park

FOREIGN PATENT DOCUMENTS

CN    101128949 A    2/2008
CN    101246957 A    8/2008
(Continued)

OTHER PUBLICATIONS

JP 2003221234—Translation.*
(Continued)

*Primary Examiner* — Ladan Mohaddes
(74) *Attorney, Agent, or Firm* — NK Patent Law, PLLC

(57) ABSTRACT

A bimodal lithium transition metal oxide based powder for a rechargeable battery, comprising: a first lithium transition metal oxide based powder, either comprising a material having a layered crystal structure consisting of the elements Li, a metal M and oxygen, wherein the Li content is stoichiometrically controlled, wherein the metal M has the formula $M=Co_{1-a}M'_a$, with $0 \leq a \leq 0.05$, and wherein M' is either one or more metals of the group consisting of Al, Ga and B; or comprising a core material and a surface layer, the core having a layered crystal structure consisting of the elements Li, a metal M and oxygen, wherein the Li content is stoichiometrically controlled, wherein the metal M has the formula $M=Co_{1-a}M'_a$, with $0 \leq a \leq 0.05$, wherein M' is either one or more metals of the group consisting of Al, Ga and B; and the surface layer consisting of a mixture of the elements of the core material and inorganic N-based oxides, wherein N is either one or more metals of the group consisting of Mg, Ti, Fe, Cu, Ca, Ba, Y, Sn, Sb, Na, Zn, Zr, Si, Nb, Mo, Ru, Rh, Pd, Ag, Cd, Sc, Ce, Pr, Nd, Gd, Dy, and Er; the first powder having an average particle size (D50) of at least 15 μm; and a second lithium transition metal oxide based powder having the formula $Li_{1+b}N'_{1-b}O_2$, wherein $0.10 \leq b \leq 0.25$, and $N'=Ni_xMn_yCo_zA_d$, wherein $0.10 \leq x \leq 0.60$, $0.30 \leq y \leq 0.80$, $0.05 \leq z \leq 0.20$ and $0 \leq d \leq 0.10$, A being a dopant, the second powder having an average particle size (D50) of less than 5 μm, and preferably less than 2 μm.

12 Claims, 8 Drawing Sheets

(56) References Cited

FOREIGN PATENT DOCUMENTS

| | | | |
|---|---|---|---|
| CN | 101300695 A | | 11/2008 |
| CN | 101369658 A | | 2/2009 |
| CN | 101646870 A | | 2/2010 |
| CN | 101808939 A | | 8/2010 |
| JP | 2003221234 | * | 8/2003 |
| JP | 2008198465 | | 8/2008 |
| JP | 2010232038 A2 | | 10/2010 |
| JP | 2012142157 A2 | | 7/2012 |
| KR | 20060094050 A | | 8/2006 |

OTHER PUBLICATIONS

Bloom et al., "Effect of cathode composition on capacity fade, impedance rise and power fade in high-power, lithium-ion cells", Journal of Power Sources 124 (2003) 538-550.*

Park, M., et al., "A Review of Conduction Phenomena in Li-Ion Batteries", Journal of Power Sources, vol. 195, Issue 24, (Jul. 2010), pp. 7904-7929.

Johnson, C.S., et al. Synthesis, Characterization and Electrochemistry of Lithium Battery Electrodes $xLi_2MnO_3 \cdot (1-x)LiMn_{0.333}Ni_{0.333}Co_{0.333}O_2$ ($0<x<0.7$), Chem. Mater. (2008), vol. 20, pp. 6095-6106.

\* cited by examiner

BIMODAL LITHIUM TRANSITION METAL BASED OXIDE POWDER FOR USE IN A RECHARGEABLE BATTERY

This application is a National Stage application of International Application No. PCT/EP2013/074961, filed Nov. 28, 2013, which claims the benefit of European Application No. 12197350.7, filed Dec. 14, 2012.

TECHNICAL FIELD AND BACKGROUND

The invention relates to a bimodal lithium transition metal based oxide powder used as positive electrode material in a Li-ion rechargeable battery, composed of two or more lithium transition metal oxide powders.

Rechargeable lithium batteries have many advantages compared to other battery systems. They show high energy density, high voltage, absence of memory effect and good cycle stability. Currently two of the major drawbacks are problems related to ionic conductivity of cathode and electrolyte, and the lack of safety of the charged battery.

The ionic conductivity of cathode materials is low. Thus liquid electrolytes—which have much faster transport rates for lithium—are used. The electrolyte fills a network of interconnected pores, ranging from the cathode over the separator to the anode. The best liquid electrolytes (e.g. salt dissolved in water) have an electrochemical stability window at low voltage, whereas the lithium ion battery operates in a high voltage window. Thus electrolytes with an electrochemical stability window at high voltage are needed. Such electrolytes are Li salts (such as $LiPF_6$ and $LiBF_4$) dissolved in organic liquids solvents, and typical examples for the liquid solvents are linear or cyclic carbonates like propylene carbonate or diethylene carbonate. These electrolytes have a relatively low ionic transport rate. The transport rate is still much higher than those of the cathode materials but much less than for water based electrolytes. These facts illustrate that the ionic transport rate across the electrode is an issue in sé. In a rechargeable Li battery the electrode thickness is determined by the liquid electrolyte properties. Without going into details—the relatively low ionic conductivity of the organic solvents and certain transport properties of binary electrolyte (electrolyte depletion) limits the thickness of the electrodes. If the current is too high or the electrodes are too thick, then a mechanism—called electrolyte shutdown—limits the capacity at high discharge rate. Electrolyte shutdown is a property related to the binary liquid electrolyte. An ionic transport within the solid cathode material is much slower, but the shut-down mechanism does not happen in the cathode material.

In order to achieve an acceptable rate performance Li ion batteries are made of electrodes which (1) contain enough porosity (to be filled with electrolyte in the final battery), and (2) need to be sufficiently thin (meaning low loading of active material ($mg/cm^2$)) to allow a reasonable transport of lithium across the electrode. Typical porosities are >12 vol %, often 15 vol %, whereas loadings of 15-20 $mg/cm^2$ are typical values. Porous, relatively thin electrodes are obtained by the relatively expensive 'thick film technology'. As the ionic transport is much faster in the electrolyte than in the solid, there is a natural limit for increasing the density of the electrodes. If the porosity is too low then not enough electrolyte is present to support a sufficient fast ionic transport. Thus it would be highly desirable to develop a cathode material which has a high ionic transport rate so that some of the Li transport across the electrode happens via the solid particles. In this way higher current rates can be applied.

The thickness of the electrodes and the porosity could be lowered, which results in an increased energy density of the lithium battery, because more active material fits into the confined volume of the battery. Or the electrodes can be prepared thicker (but still support a high rate) and the porosity can be decreased. No cathode material has yet been reported whose ionic transport rate approaches those of liquid electrolytes.

Currently, due to a lack of safety of a charged battery, Li metal cannot be used as anode. In general, anodes which contain extractable lithium are dangerous to handle and are difficult to process. As a result the lithium needs to be supplied by the cathode, which potentially limits the choice of cathodes. The cathode typically is a lithium containing intercalation material. In intercalation materials lithium can be electrochemically reversibly extracted and reinserted. Presently only lithium transition metal oxides (or phosphates) are used as cathodes in rechargeable Li ion batteries. In the charged battery a delithiated transition metal oxide is in good contact with the organic electrolyte, as the latter fills the pores between the particles. If the battery becomes "unsafe" (for example by external damage or heating) then a chain of reactions can be triggered. A main reaction—very much determining the safety of the real battery—is the reaction between the delithiated cathode and the liquid electrolyte. This reaction is basically the combustion of the solvent with oxygen from the charged cathode. We will call it CCE (charged cathode-electrolyte) reaction within this invention. Batteries with less, or without organic electrolyte would potentially be much safer because no CCE reaction can happen. Such batteries are not available, because the rate performance of the battery is too low, as was discussed above.

Carbon based anodes have been widely applied in rechargeable lithium batteries. A typical charge capacity Qch (lithiation of the anode) is 360 mAh/g and a typical discharge capacity Qdc (delithiation of the anode) is 330 mAh/g. Thus a typical anode charge efficiency is 330/360=91.7%. It is convenient to consider the irreversible capacity instead: Qirr=1 minus charge efficiency, or Qirr=(Qch−Qdc)/Qch. A rechargeable lithium cell contains cathode and anode. The best utilization of the reversible capacities of anode and cathode—yielding a good cell balancing—is achieved if the charge efficiencies match. If not, an excess of cathode or anode material is needed, which excess does not contribute to the capacity of the lithium battery. Moreover the charge efficiency should be matched not only at slow charge/discharge, but also at fast discharge.

In the following discussion we focus on Li batteries with very high energy density. Very high energy density can be achieved by cathodes having either one or (preferably) both of a high volumetric density and a high specific reversible discharge capacity.

High volumetric density is easily obtained with relatively large, dense particles. $LiCoO_2$ (LCO) is a very preferred material and can obtain high electrode density. This applies especially to $LiCoO_2$ as described in WO2012-171780. $LiNiO_2$ based materials also allow for relatively high density electrodes as well. Such particles can only be applied in a battery if the Li diffusion constant of the positive electrode is sufficiently high. If Li diffusion is too slow then the diffusion path within the particles needs to be shortened, which can be achieved by reducing size and increasing intra particle porosity, thus ultimately resulting in nano-structured (high surface area and meso porous) cathode materials. It is practically very difficult or even impossible to achieve high density with nano structured cathode materials.

A high specific capacity can be achieved with high lithium and manganese compositions—also called HLM, being Li—Mn—Ni—$O_2$ with Li:M>>1 and Mn:Ni>>1—cathode materials. They can be understood as a solid state solution of $Li_2MnO_3$ and $LiMO_2$ where M=$(Ni_{1/2}Mn_{1/2})_{1-y}Co_xNi_y$. x>0 signifies Co doped HLM. These compounds are sometimes considered to be nano-composites. A strict distinction between the compounds is not possible because a nano-composite—as the composite size decreases towards atomic scale becomes a solid state solution. Undoped HLM cathode materials have a very high capacity—up to 290 mAh/g. The 290 mAh/g is typically achieved after several activation cycles at a voltage of 4.8V and discharge to 2.0V. These HLM cathode materials generally have very poor electronic conductivity and slow lithium diffusion, and therefore are prepared as nano-structured powders, making it very difficult to achieve a high electrode density. After activation undoped HLM cathodes need to be charged to high voltage (at least 4.5-4.6V) otherwise their capacities are not sufficiently high. At these high voltages, surprisingly, HLM can cycle in a stable manner with little capacity fading.

The cathode materials mentioned before—$LiCoO_2$ (LCO) and HLM—are not matching the anode charge efficiency well. $LiCoO_2$ as described in WO2012-171780 can have a very high charge efficiency of about 99%, even at high rate, which is much higher than that of typical anode materials. This high charge efficiency is also obtained with large particles having low surface area. Even these large particles show a high rate performance and very high charge efficiency, also at fast rate. Contrary to this, HLM has a low charge efficiency, which decreases dramatically if the rate is increased. Even submicron sized HLM cathode materials (with a D50 of 0.5-0.9 μm) with high surface area show poor rate performances and low charge efficiencies at fast rate.

Even if different materials exist that provide either high volumetric density or high specific capacity, there is the need to develop one material that has both characteristics, and at the same time has a high ionic conductivity and enables to operate in a rechargeable battery in a safe manner, and well balanced with the anode material.

SUMMARY

The current invention discloses a cathode material which combines the above mentioned properties. Viewed from a first aspect, the invention can provide a bimodal lithium transition metal oxide based powder for a rechargeable battery, comprising:

a first lithium transition metal oxide based powder, either comprising a material A having a layered crystal structure consisting of the elements Li, a metal M and oxygen, wherein the Li content is stoichiometrically controlled, wherein the metal M has the formula M=$Co_{1-a}M'_a$, with $0 \le a \le 0.05$, and wherein M' is either one or more metals of the group consisting of Al, Ga and B;

or comprising a material B having a core and a surface layer, the core having a layered crystal structure consisting of the elements Li, a metal M and oxygen, wherein the Li content is stoichiometrically controlled, wherein the metal M has the formula M=$Co_{1-a}M'_a$, with $0 \le a \le 0.05$, wherein M' is either one or more metals of the group consisting of Al, Ga and B; and the surface layer consisting of a mixture of the elements of the core material and inorganic N-based oxides, wherein N is either one or more metals of the group consisting of Mg, Ti, Fe, Cu, Ca, Ba, Y, Sn, Sb, Na, Zn, Zr, Si, Nb, Mo, Ru, Rh, Pd, Ag, Cd, Sc, Ce, Pr, Nd, Gd, Dy, and Er; the first powder having an average particle size (D50) of at least 15 μm; and a second lithium transition metal oxide based powder having the formula $Li_{1+b}N'_{1-b}O_2$, wherein $-0.03 \le b \le 0.25$, and N'=$Ni_xMn_yCo_zA_d$, wherein $0.10 \le x \le 0.60$, $0.30 \le y \le 0.80$, $0.05 \le z \le 0.20$ and $0 \le d \le 0.10$, A being a dopant, the second powder having an average particle size (D50) of less than 5 μm, and preferably less than 2 μm.

In one embodiment $0.15 \le x \le 0.30$, $0.50 \le y \le 0.75$, $0.05 \le z \le 0.15$ and $0.10 \le b \le 0.25$, preferably $0.18 \le b \le 0.25$. In another embodiment, the first powder consists of large dense particles having a D50 of at least 15 μm, preferably at least 25 μm, and most preferably at least 30 μm. In another embodiment, the bimodal lithium transition metal oxide based powder has a ratio of the D50 value of the first powder to the D50 of the second powder of at least 3:1 when the first powder comprises material B, and at least 5:1 when the first powder comprises material A or B. In a further embodiment, the first powder has an electrical conductivity of less than $10^{-3}$ S/cm, preferably less than $10^{-4}$ S/cm, measured under a pressure of 63.7 MPa. D50 is the median of the particle size distribution measured by laser diffraction.

In another embodiment, the bimodal lithium transition metal oxide based powder has a ratio of the D50 value of the first powder to the D50 of the second powder is at least 3:1 when the first powder comprises material B, and at least 5:1 when the first powder comprises material A or B. In a further embodiment, the first powder has an electrical conductivity of less than $10^{-3}$ S/cm, preferably less than $10^{-4}$ S/cm, measured under a pressure of 63.7 MPa. D50 is the median of the particle size distribution measured by laser diffraction.

The bimodal lithium transition metal oxide based powder may have a $1^{st}$ cycle discharge capacity of at least 220 mAh/g of active material, when used as an active component in a coin cell which is cycled between 2.0 and 4.6 V vs. $Li^+/Li$ at a discharge rate of 0.05 C, and preferably 0.1 C, at 25° C. In one embodiment, the first powder has a first cycle charge efficiency of >96% when cycled at 3.0-4.6V, at 25° C., with a current of 16 mA/g at 25° C. in a standard electrolyte (1 m $LiPF_6$ in EC/DEC 1:2); and the second powder may have an activation voltage characterized by a charge capacity of at least 290 mAh/g when charging from 3.0 to 4.8V with a current of 80 mA at 25° C., in a standard electrolyte (1 m $LiPF_6$ in EC/DEC 1:2). Further features of embodiments of the bimodal lithium transition metal oxide based powder are listed in the claims.

Key aspects of the embodiments of the present invention are:

1) The cathode powder allows for low porosity electrodes. In one embodiment the cathode powder consists of a mixture of large dense particles with low surface area and submicron sized small particles with high surface area. In another embodiment of the invention the low porosity is achieved by very large particles of suitable shape.

2) For the bimodal powder embodiments the requirements for the large and small particles are different from each other. Therefore the composition of large and small particles is different. In one embodiment of the invention the large particles consist of a voltage stable LCO based cathode material, and the small particles consist of HLM.

3) The LCO based material has been optimized to obtain very fast solid lithium diffusion rates and to be able to cycle with stability at high voltage. In one embodiment the LCO based material cycles stably at 4.5V (versus Li/Li+) after a first charge at 4.6-4.7V. The optimization of the LCO based cathode material is related to a low electronic conductivity and a lithium to transition metal ratio of 1.0. The high voltage stable compounds are further disclosed in co-pending application WO2012-171780, which is incorporated by reference and in its entirety herein.

The process for manufacturing this kind of high stability compounds is a 'double firing' process and runs as follows:

providing a first mixture of a first Co-comprising and a first Li-comprising precursor powder, the first mixture having a Li to Co molar ratio >1.00, sintering this mixture in an oxygen comprising atmosphere at a temperature $T_1$ of at least 600° C., thereby obtaining a Li-enriched $LiCoO_2$ compound;

providing a second Co-comprising precursor powder, mixing the Li-enriched $LiCoO_2$ compound and the second Co-comprising precursor powder, and sintering the second mixture in an oxygen comprising atmosphere at a temperature $T_2$ of at least 600° C.

In one embodiment, the first mixture has a Li to Co molar ratio of 1.01 to 1.12.

In another process embodiment, the step of providing a second Co-comprising precursor powder comprises the substeps of:

providing a third Co-comprising precursor powder, providing a second Li-comprising precursor powder, and mixing quantities of the third Co-comprising precursor powder and the second Li-comprising precursor powder so as to obtain the second Co-comprising precursor powder having a Li to Co molar ratio that is below 0.9, and preferably below 0.5.

In one embodiment, the second Li-comprising precursor powder is a lithium carbonate powder. In another embodiment, the third Co-comprising precursor powder is free of lithium. In still another embodiment, the first Co-comprising and the second Co-comprising precursor powders are selected from the group consisting of cobalt oxide, cobalt oxy-hydroxide, cobalt hydroxide, cobalt carbonate and cobalt oxalate. Also the third Co-comprising precursor powders may be selected from the group consisting of cobalt oxide, cobalt oxy-hydroxide, cobalt hydroxide, cobalt carbonate and cobalt oxalate.

4) The HLM based cathode material has been optimized to (a) have high volumetric capacity in mixtures with said $LiCoO_2$ (b) have large reversible capacity and (c) be fully activated after only one activation cycle at 4.6-4.7V In one embodiment this performance has been achieved by doping HLM with 5-20 mol % of cobalt.

DETAILED DESCRIPTION

Figure 1:
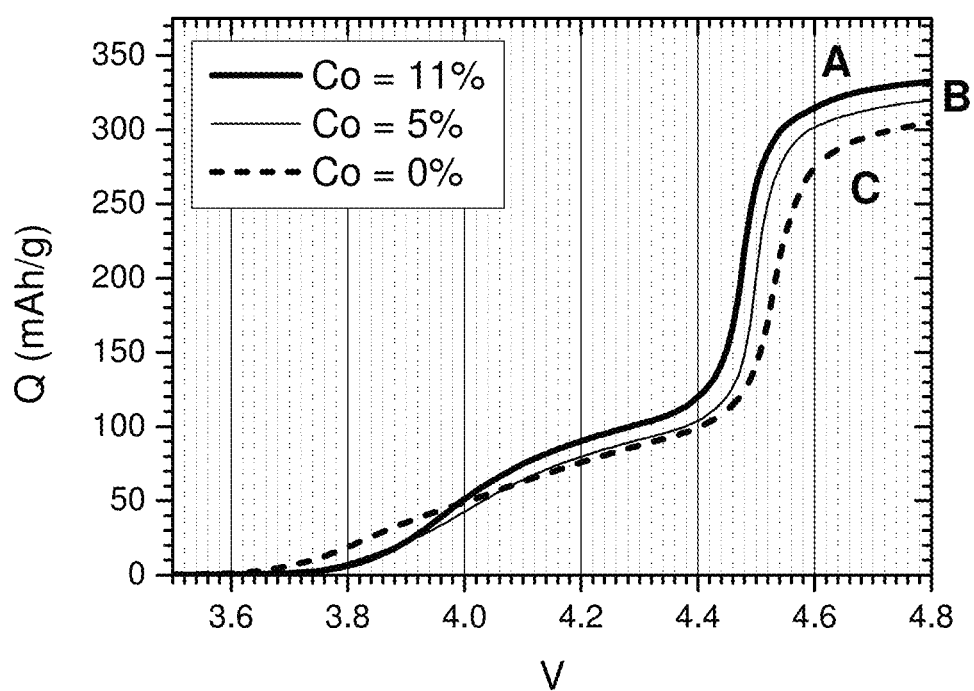
FIG. 1: Voltage profile (capacity of first charge as function of charge voltage) of HLM with (a) 11 mol %, (b) 5 mol % and (c) 0 mol % Co.

It was mentioned before that there is a need for Li batteries with very high energy density, that can be achieved by cathodes having preferably both of a high volumetric density and a high specific reversible discharge capacity. Also, as the cathode's charge efficiency should match well with the charge efficiency of typical anode materials, a mixture of LCO and HLM should be an ideal material. In one embodiment, a way of mixing to achieve especially high densities is the bimodal approach, where two powders are mixed. One powder consists of relatively large, dense particles, whilst the other powder has small particles. These small particles may be nano-structured. The small particles can easily be pressed into the voids between the large particles. Obviously this approach will reduce the porosity of the electrode and allows to implement nano structured cathode materials without loosing density. Since the low porosity reduces the transport rate in the liquid electrolyte, it is compensated by a high transport rate in the solid material.

Moreover, the bimodal mixture can be applied practically to lithium batteries if the operating voltages of LCO and HLM are adjusted to each other. HLM requires an "activation charge" of typically 4.8V. This voltage is generally conceived to be too high, as it was assumed that neither $LiNiO_2$-based, nor $LiCoO_2$-based materials can cycle stably between 2V and 4.5-4.6V. In the present invention, a technique is disclosed to lower the voltage of the activation cycle of HLM and/or to increase the operating voltage of the LCO.

In one embodiment, the invention makes use of the advantages of the high voltage stable $LiCoO_2$ that is disclosed in co-pending application WO2012-171780, describing a lithium metal oxide powder for use as a cathode material in a rechargeable battery, consisting of a core material and a surface layer, the core having a layered crystal structure consisting of the elements Li, a metal M and oxygen, wherein the Li content is stoichiometrically controlled, wherein the metal M has the formula $M=Co_{1-a}M'_a$, with $0 \leq a \leq 0.05$, wherein M' is either one or more metals of the group consisting of Al, Ga and B; and the surface layer consisting of a mixture of the elements of the core material and inorganic N-based oxides, wherein N is either one or more metals of the group consisting of Mg, Ti, Fe, Cu, Ca, Ba, Y, Sn, Sb, Na, Zn, Zr and Si. There could also be more elements doped in the surface layer, such as 4d elements and Rare-earth metals, like Er, Nd and Nb. This material has a reversible electrode capacity of at least 200 mAh/g, preferably 210 mAh/g and most preferably 215 mAh/g when used as an active component in a cathode which is cycled between 3.0 and 4.6 V vs. $Li^+/Li$ at a discharge rate of 0.1 C, and preferably at 1 C, at 25° C. It also has a 1 C rate capacity fading value below 60%, preferably below 40% and most preferably below 30%. The capacity fade rate—expressed in %—at 1 C per 100 cycles is calculated as follows: (1−(DQ32/DQ8))×100/23. (DQn=discharge capacity of cycle n).

The cathode material of the present invention has the following properties:

(1) Electrodes having a low porosity allowing for
  (a) the use of less liquid electrolyte providing better safety
  (b) a high content of active material providing high volumetric and gravimetric capacity and energy density.
  To achieve low porosity electrodes the cathode may consist of particles which have a bimodal size distribution. In this case the small particles will fit well into the voids between the large particles.
(2) Electrodes having a high reversible capacity. A high reversible capacity allows to decrease the electrode thickness at constant capacity, so the total porosity decreases. It is the total porosity (total volume of pores in the electrode) which matters for safety and not the porous fraction (pore volume/electrode volume).
3) The cathode material allows for very high ionic transport rate in the solid phase. This allows achieving a good rate performance even in the case of low porosity electrodes because solid lithium diffusion can act as a shortcut between the narrow liquid diffusion paths within the electrolyte filled pores. For an efficient solid shortcut, if the cathode powder has a bimodal particle size distribution at least the large particle fraction has a high solid Li diffusion rate.
(4) The cathode material has a charge efficiency which matches well the charge efficiency of typical anode materials.
(5) The cathode material has a high gravimetric and volumetric capacity and energy density. It performs well (rate performance, cycling stability, . . . ) within the operating window of the lithium battery.

Regarding the safety of the battery, a schematic example for a CCE reaction goes as follows—for $LiCoO_2$ as cathode material: the battery is charged, meaning that Li is extracted from the cathode by the reaction:

$$LiCoO_2 \xrightarrow[-x(Li^+ -e^-)]{} Li_{1-x}CoO_2 \quad (1)$$

Charging in this case needs high energy, since a potential of ≅4V is needed to extract the lithium. Therefore the charged cathode is thermodynamically highly unstable. The equilibrium phases of charged LCO (in air) are $LiCoO_2 + Co_3O_4$. The following reaction is thermodynamically strongly favored:

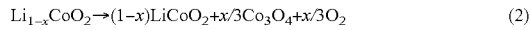

$$Li_{1-x}CoO_2 \rightarrow (1-x)LiCoO_2 + x/3 Co_3O_4 + x/3 O_2 \quad (2)$$

Thermodynamic estimations show that this reaction has a very high ΔG (free enthalpy change) but only a small ΔH (enthalpy change). As a result not much heat evolves.

However, the situation is different in a real battery, where organic electrolyte is present. The evolved oxygen will combust a part of the electrolyte creating large amounts of heat. The electrolyte will also reduce $Co_3O_4$ to CoO. As an example of organic electrolyte we use ethylene carbonate, and assume, for simplicity, full combustion:

$$5/2 O_2 + C_3H_4O_3 \rightarrow 3CO_2 + 2H_2O \quad (3)$$

Schematically the CCE reaction in a real battery can be written as

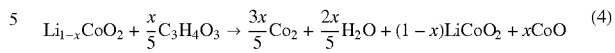

$$Li_{1-x}CoO_2 + \frac{x}{5}C_3H_4O_3 \rightarrow \frac{3x}{5}Co_2 + \frac{2x}{5}H_2O + (1-x)LiCoO_2 + xCoO \quad (4)$$

This equation tells us about the limitations of the CCE reaction:
1) Decrease x: less de-lithiated cathodes create less heat because less oxygen is evolved to combust the electrolyte. Decreasing x or the amount of $LiCoO_2$ is not meaningful because this will reduce the capacity of the battery.
2) Decrease the electrolyte: if it would be possible to make a Li ion battery where the electrolyte content is lower than x/5 (x state of charge in mol Li) per mol of $LiCoO_2$ then safety will improve because not enough electrolyte is present to complete the CCE reaction.

If the lithium transition metal oxide contains Mn or Ni instead of Co, this will not so much change the evolved heat of the combustion of the electrolyte, but can change the kinetics dramatically, because delithiated $Li_{0.5}CoO_2$ (with Co in 4 valent state) is much more reactive than delithiated $Li_{0.5}Ni_{0.5}Mn_{0.5}O_2$ (where the 4 valent Ni is "diluted" by much more inert $Mn^{4+}$). Much less reactive means that it is more difficult to start the CCE reaction (the battery needs a larger external heat or damage). Additionally if Mn is present then eventually less electrolyte is combusted because some 3 valent Mn (e.g. in $Mn_3O_4$) remains, so less oxygen is delivered (and less electrolyte is combusted). Within this reaction we will—in our examples—focus on $LiCoO_2$, but the same conclusions are valid for other cathode materials as well.

A very important aspect of cell safety is to lower the amount of exothermic heat generated if a cell gets unsafe. At relatively low temperature (about 200-300° C.) the charged cathode starts to react with the electrolyte. The charged cathode is in an oxidized state, so it is able to release oxygen, which combusts the electrolyte. The combustion reaction contributes a large amount of the heat when a battery gets unsafe. The higher the extracted capacity, the more the cathode is oxidized, and the more oxygen is supplied to combust the electrolyte. Obviously, if less electrolyte is present than needed to consume all oxygen then less combustion will happen and the safety of the battery improves. Reducing the electrolyte below a certain critical amount (where amount of oxygen releasable from the cathode and amount of electrolyte are in balance to allow full combustion) will improve safety. The critical amount increases with increasing extracted capacity in what is called the electrolyte cathode balance.

The pores in the electrodes must be filled with electrolyte otherwise the battery will have a poor performance. From a safety point of view it is desired to achieve a small porosity as much as possible, below the "critical porosity" which corresponds to the critical electrolyte amount, defined by the electrolyte cathode balance. So it is desired to decrease the porosity of the electrodes (and separator). However, there is a limit because state of the art batteries need electrolyte to facilitate the fast lithium diffusion in the liquid phase. In this sense, the current invention discloses that it is possible to achieve a well functioning battery with very low porosity, much below the critical porosity.

To summarize: one aspect of the present invention is to provide a high density electrode which has a low porosity much below of the critical porosity. Another aspect of the invention is to increase the amount of x (extracted Lithium at full charge per g of cathode). By utilizing these aspects the safety of the Li rechargeable battery is improved because not enough electrolyte is present to allow for a completed CCE reaction.

The bimodal approach of embodiments of the present invention yields high capacity and low porosity electrodes. HLM has a low electrode density, low ionic transport and also very low electronic conductivity. By amending these parameters by mixing HLM with a different large particle powder, a dense cathode powder is obtained. The $LiCoO_2$ or $LiNiO_2$ based materials consist of relatively large (>10 μm) particles, and the nano-structured HLM occupies the voids, resulting in a high electrode density.

In dynamic cell balancing the irreversible capacity of both anode and cathode are to be compared. The irreversible capacity is the 1$^{st}$ charge inefficiency Qirr={Q(Charge)−Q(Discharge)} divided by Q(Charge). The highest cell capacity is achieved if the irreversible capacities are balanced. If the anode shows a much larger irreversible capacity than the cathode then a lower cell capacity is achieved because not all of the cathode capacity is utilized. On the one hand, the high voltage $LiCoO_2$ based cathodes of the present invention have very low irreversible capacity. Even at relatively high rate the value is less than 5% which is much less than the value of typical anodes. On the other hand, the HLM type cathode materials have a larger irreversible capacity, which dramatically increases with the discharge rate, and at fast rate the irreversible capacity by far exceeds the value for typical anodes. It has been found that a mixture of high voltage stable $LiCoO_2$ and HLM can allow improving the cell balancing as well as dynamic cell balancing, thus the capacity of the cell can be increased. The electrode contains large, dense $LiCoO_2$ based particles. The $LiCoO_2$ used in the invention has high bulk lithium transport rate and can be cycled in a stable manner at high voltage 4.35V) in full cells. The high voltage stability allows the addition of low cobalt high voltage—high capacity cathode materials—i.e. the Co doped HLM materials—to the cathode.

The $LiCoO_2$ forms an ideal framework to add the HLM high voltage—high capacity but low power cathode materials. As a result electrode density increases (yielding higher capacity) and porosity decreases (yielding a better safety). The $LiCoO_2$ particles create a fast path for Li diffusion across the electrode, partially replacing the liquid electrolyte. The submicron sized cathode material does itself not allow to obtain mechanically stable relatively thick electrodes without using large amounts of binder. However, the $LiCoO_2$ based framework supplies stability. By mixing with the large particle dense $LiCoO_2$ mechanically stable electrodes can be obtained. The high cathode voltage allows extracting more lithium per cathode volume. This—relatively to the capacity of the full cell—decreases the amount of electrolyte present per unit of capacity. Thus a full combustion of all electrolyte delivers less heat per unit capacity. As a result the safety per unit capacity is improved.

In embodiments of the present invention, cathode materials are characterized by
on the one hand:
(1) large dense particles
  (a) to achieve a high electrode density with low porosity, and
  (b) to enable a short solid diffusion path across the electrode,
(2) excellent high voltage stability (so that it can be cycled in the same voltage window as HLM), and
(3) high ionic transport rate.
And on the other hand: agglomerates consisting of primary particles that consist of nano-structured or submicron-sized high capacity cathode material such as HLM, to achieve an electrode with very high electrode density in mixtures that can be used in a high voltage battery.

The invention is further illustrated in the following examples:

Example 1: Importance of Cobalt Doping of HLM

A major problem to cycle a mixture of large particles LCO and smaller particles HLM is the high voltage which is required during first charge of HLM. A typical value is 4.8V, but with each 10 mV that this voltage can be lowered the undesired side effects—e.g. the high voltage electrolyte decomposition—will become less severe. The current example shows that the voltage of the HLM can be lowered. Increasing the Co doping level causes a desired decrease of the charge voltage. Otherwise, too much Co doping is not desired because it reduces the reversible capacity.

3 MOOH precursors are prepared by precipitating a M-$NO_3$ solution with a NaOH solution in the presence of ammonia. The cobalt content of the solutions is varied from 0 to 8.3 to 16.7 wt %. Table 1.1 lists the ICP analysis of the 3 precursors. The composition is very near to the targeted value. Of each precursor 3 samples with different Li:M ratio are prepared. Each precursor is mixed with $Li_2CO_3$ and cooked at 800° C. in air for 8 hours. The target Li:M value is calculated as follows: assuming a composition of the final sample $Li_{1+x}M_{1-x}O_2$ where all Mn is tetravalent, all Co is 3-valent and Ni can be 3- or 2-valent. The target Li:M ratio is given by Li:M=(1+x)/(1−x) where x is calculated to give
  (a) all Ni is 2-valent
  (b) average Ni valence state is 2.5 and
  (c) all Ni is 3-valent.

The first charge voltage profile is obtained by coin cell testing. The charge rate is 80 mA/g upto 4.8V. In the following the best results (highest capacity of each transition metal composition) are listed. FIG. 1 illustrates the voltage profile (capacity in mAh/g of first charge as function of charge voltage V) of HLM with (A) 11 mol %, (B) 5 mol % and (C) 0 mol % Co. With increasing Co doping we observe a lowering of the first cycle charge voltage in the plateau region. The decrease is approx. 60 mV per mol % of Co doping. The example demonstrates that HLM, when mixed with large LCO based material, is preferably doped with cobalt. Preferred doping range is 5-20 mol %. The cobalt doping reduces the necessary charge voltage for FILM, so the LCO and HLM charge voltage profiles matches better.

TABLE 1.1

Composition of Co containing HLM precursors

| Sample ID | Ni wt % | Co wt % | Mn wt % | Metal composition |
|---|---|---|---|---|
| PHLM-011 | 10.87 | 11.04 | 40.36 | $Mn_{0.664}Ni_{0.169}Co_{0.167}$ |
| PHLM-010 | 12.75 | 4.96 | 40.45 | $Mn_{0.710}Ni_{0.209}Co_{0.081}$ |
| PHLM-012 | 15.61 | 0.092 | 43.48 | $Mn_{0.747}Ni_{0.251}Co_{0.001}$ |

Example 2: Activation of Cobalt Doped HLM

A mixed transition metal hydroxide is obtained by conventional precipitation (metal sulfate with NaOH in the presence of ammonia). The metal composition is M=$Ni_{0.22}Mn_{0.66}Co_{0.11}$. The average particle size (D50 of the PSD) is about 8 μm. The precursor is relatively dense (tap density=1.36 g/$cm^3$). A final lithium metal oxide (HLM type) is prepared by mixing with $Li_2CO_3$ (Li:M=1.57, corresponding to 50% of the Ni being 2-valent and 50% being 3-valent, assuming all Co is 3-valent and all Mn tetravalent). A high sintering temperature of 1000° C. is applied resulting in relative dense particles with relatively small surface area (0.65 $m^2/g$). SEM shows that primary crystallites are ranging from about 0.2 to 0.5 µm in size. Typical secondary or agglomerated particles have sizes of about 5-10 µm.

Such a morphology is not preferred for obtaining a high electrochemical performance for HLM. Good performance is achieved after much softer sintering resulting in significant significantly smaller crystallites. Typically also better performance is achieved in the case of smaller particle sized precursors. However, for experimental purposes, after these strong sintering conditions particular electrochemical performance issues of HLM are clearly detected. After strong sintering the activation typically requires high voltage and several cycles. We speculate that the activation is related to an electrochemical grinding. Large particles have severe rate performance issues, so a large increase of capacity as a result of electrochemical grinding is observed. In the case of cobalt doping however, activation is no problem, as will be shown in this Example.

Coin cells are prepared by known standard methods. Coin cell testing involves 3 different types of activation (different voltages, and 1 or 10 cycles), followed by a test for rate performance and cycle stability. The cycling schedule details are given in Table 2.1 below. Independently of the type of activation, the tests for rate performance and cycling stability give identical results. Very tiny differences even indicate that lower voltage and less activation cycles gives an advantage!

We conclude that in the case of Co doped HLM:
1) 1 activation cycle is sufficient, and
2) 4.6V is sufficient as activation voltage.

Figure 2A:
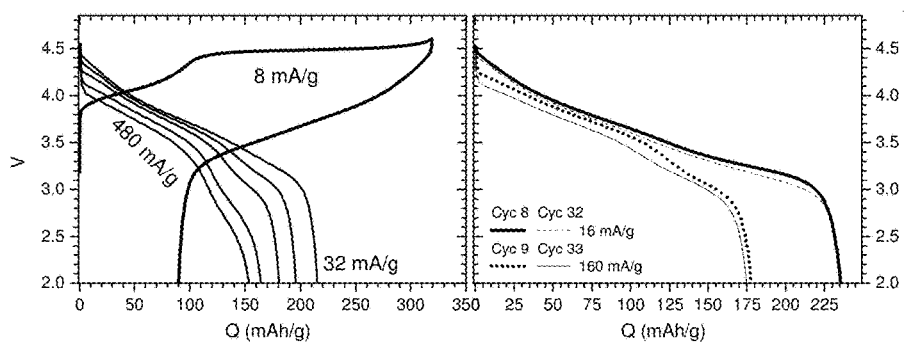
FIGS. 2A, 2B, 2C: HLM rate and stability tests after different types of activation
Figure 2B:
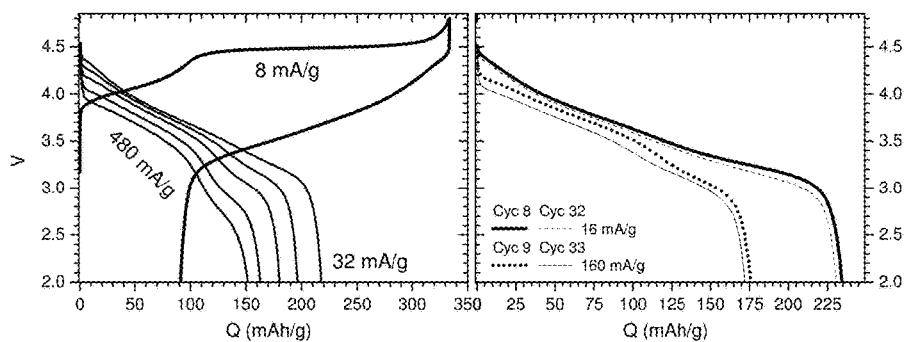
Figure 2C:
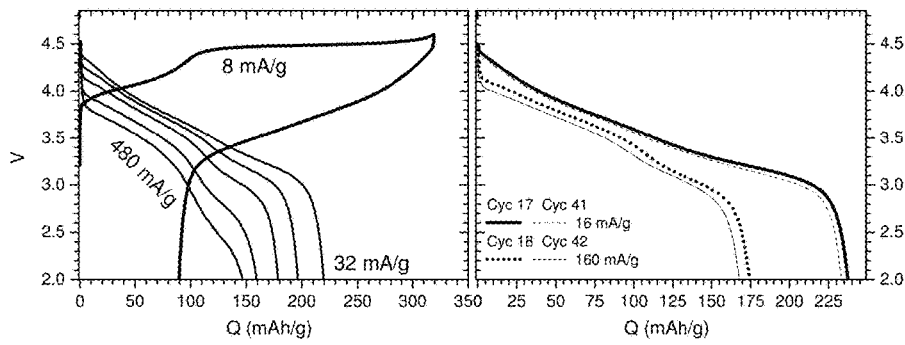

Details of the coin cell testing are summarized in FIGS. 2A-C, illustrating:
(A): Rate and stability after single cycle activation at 4.6V (N=1, V1=4.6V)
(B): Rate and stability after single cycle activation at 4.8V (N=1, V1=4.8V)
(C): Rate and stability after 10 cycles activation at 4.6V (N=10, V1=4.6V).

For each of FIGS. 2(A), 2(B) and 2(C) the left figure shows cycles 2-7 (from right to left), the right figure cycles 8, 9, 32 & 33 (from right to left).

A similar experiment is performed for a Co doped HLM prepared at lower temperature from a fine particle precursor. The surface area is much larger, about 5 $m^2/g$. It is confirmed that also for such HLM cathode performance after a single activation at 4.6V gives the best performance.

TABLE 2.1

| | Cycle schedule definition | | | | |
|---|---|---|---|---|---|
| | Charge | | Discharge | | |
| Cycle | Voltage, current | Type | Voltage, current | Type | Purpose |
| 1 to N | V1, 0.1 C | CC | 2.0 V, 0.1 C | CC | Activation of HLM |
| 1 + N to 6 + N | 4.6 V, 0.25 C/0.05 C | CC/CV | 2.0 V, 0.2, 0.5, 1, 2, 3 C | CC | Rate performance |
| 7 + N, 31 + N | 4.6 V, 0.25 C/0.1 C | CC/CV | 2.0 V, 0.1 C | CC | Slow reference cycle before/after stability test |

TABLE 2.1-continued

| | Cycle schedule definition | | | | |
|---|---|---|---|---|---|
| | Charge | | Discharge | | |
| Cycle | Voltage, current | Type | Voltage, current | Type | Purpose |
| 8 + N, 32 + N | 4.6 V, 0.25 C/0.1 C | CC/CV | 2.0 V, 1 C | CC | Fast reference cycle before/after stability test |
| 9 + N to 30 + N | 4.6 V, 0.25 C | CC | 2.0 V, 0.5 C | CC | Stability test |

(CC = constant current,
CC/CV = constant current/constant voltage)

Example 3: Voltage Compatibility of LCO and HLM

HLM type materials are considered to require special formation cycles. A typical formation schedule is an activation either at 4.8V for one or more cycles. 4.8V is a very high voltage; when HLM is mixed with other cathode materials a 4.8V cycle can damage other cathode components. Alternatively it is often recommended to gradually increase the voltage during several formation cycles. Implementing such complex special formation at mass production requires severe investment and makes the application of HLM difficult in real cells. Example 2 showed that for HLM containing cobalt a single activation cycle at 4.6V is sufficient. Cycling HLM at 4.5V gives a high capacity. (At 4.5V the capacity is only about 5% less than 4.6V capacity.) Example 3 will show that these formation conditions of Example 2 are compatible with the "high voltage $LiCoO_2$" discussed before. This is an important requirement if HLM and LCO cathode materials are used together. Example 3 proves that a mixture of HLM with high voltage $LiCoO_2$ can cycle well in real batteries.

A high voltage stable $LiCoO_2$ based cathode is obtained from a pilot plant, according to co-pending application WO2012-171780. The Li:Co ratio is 1.0 and the electrical conductivity of the LCO powder is below $10^{-4}$ S/cm ($1.2*10^{-5}$ S/cm). The conductivity is measured under a pressure of 63.7 MPa at room temperature. The LCO contains Mg (1 wt %). The majority of particles have a large size of 20 µm. The average particle size (D50 of the PSD) is 18 µm. The surface area of the $LiCoO_2$ based cathode is 0.18 $m^2/g$.

Coin cell testing is performed according to different schedules named V3.1-V3.2. V3.1 is the charge voltage of cycle 1 whereas V3.2=4.5V, being the charge voltage of cycles 2-32. Table 3.1 summarizes the schedules, and Table 3.2 summarizes the obtained results. The table shows the capacity loss and energy loss (capacity×average voltage) per 100 cycles (in percent) extrapolated from cycle 7 and 31 (for 1 C rate) and cycle 8 and 32 (for 0.1 C rate) The data in Table 3.2 show that V3.1=4.3V gives an excellent cycle stability. A similar stability is obtained with V3.1=4.6V. V3.1=4.7V still shows acceptable cycle stability (but less than V3.1=4.6V) whereas V3.1=4.8V shows some deterioration.

From Table 3.2 we can conclude that high voltage $LiCoO_2$ used in the present invention is compatible with HLM. High voltage stable $LiCoO_2$ tolerates an activation cycle at ≥4.6V, and allows for cycling without significant capacity fade at 4.5V. Example 2 demonstrated similar electrochemical testing for HLM. Example 3 demonstrates that the electrochemical properties of high voltage stable $LiCoO_2$ is compatible with HLM type voltage range, particularly if the HLM contains Co allowing to reduce the voltage V1 of a single activation cycle to 4.6V.

TABLE 3.1

Cycling schedule V 3.1-V 3.2 (1 C = 160 mA/g)

| | Charge | | Discharge | | |
|---|---|---|---|---|---|
| Cycle | Voltage, current | Type | Voltage, current | Type | Purpose |
| 1 | V3.1, 0.1 C | CC | 2.0 V, 0.1 C | CC | Activation of HLM |
| 2-6 | V3.2, 0.25 C/0.05 C | CC/CV | 2.0 V, 0.2, 0.5, 1, 2, 3 C | CC | Rate performance |
| 7, 31 | V3.2, 0.25 C/0.1 C | CC/CV | 2.0 V, 0.1 C | CC | Slow reference cycle before/after stability test |
| 8, 32 | V3.2, 0.25 C/0.1 C | CC/CV | 2.0 V, 1 C | CC | Fast reference cycle before/after stability test |
| 10-31 | V3.2, 0.25 C | CC | 2.0 V, 0.5 C | CC | Stability test |

TABLE 3.2

Coin cell testing results for high voltage stable $LiCoO_2$

| Voltage V3.2 = 4.5 V | DQ mAh/g | Qirr % | Q (0.1 C) %/100 | Q (1 C) %/100 | E (0.1 C) %/100 | E (1 C) %/100 | $Q_{4.5V}$ (0.1 C) mAh/g | $Q_{4.5V}$ (1 C) mAh/g |
|---|---|---|---|---|---|---|---|---|
| V3.1 = 4.3 V | 161.0 | 1.1 | 3.1 | 6.9 | 3.5 | 9.0 | 194.5 | 189.6 |
| V3.1 = 4.6 V | 228.8 | 1.3 | 3.4 | 7.6 | 3.9 | 10.0 | 194.1 | 188.4 |
| V3.1 = 4.7 V | 250.9 | 1.6 | 4.7 | 11.6 | 5.8 | 14.7 | 193.2 | 187.2 |
| V3.1 = 4.8 V | 255.9 | 1.7 | 5.8 | 15.6 | 7.2 | 19.5 | 193.0 | 187.0 |

The following definitions are used for data analysis: (Q: capacity, DQ: Discharge Capacity, CQ: Charge Capacity)

The discharge capacity QD is measured during the first cycle in the 4.3-3.0 V range at 0.1 C (in mAh/g). Irreversible capacity Qirr is (QC1−QD1)/QC1 (in %).

Fade rate (0.1 C) per 100 cycles, for capacity Q (0.1 C): (1−QD31/QD7)*100/23.

Fade rate (1 C) per 100 cycles, for capacity Q (1 C): (1−QD32/QD8)*100/23.

Energy fade E (0.1 C) & E (1 C): instead of discharge capacity QD the discharge energy (capacity×average discharge voltage) is used.

$Q_{4.5V}$ (0.1 C) and $Q_{4.5V}$ (1 C): discharge capacity of cycle 7 (at 0.1 C) and of cycle 8 (at 1 C)

Figure 3A:
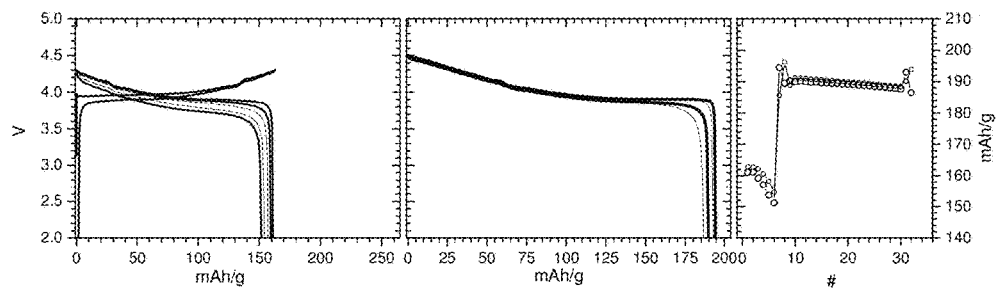
FIGS. 3A, 3B, 3C: electrochemical testing of high voltage stable $LiCoO_2$
Figure 3B:
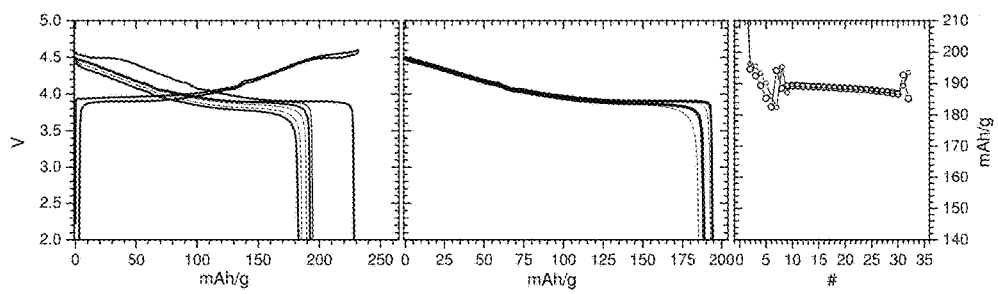
Figure 3C:
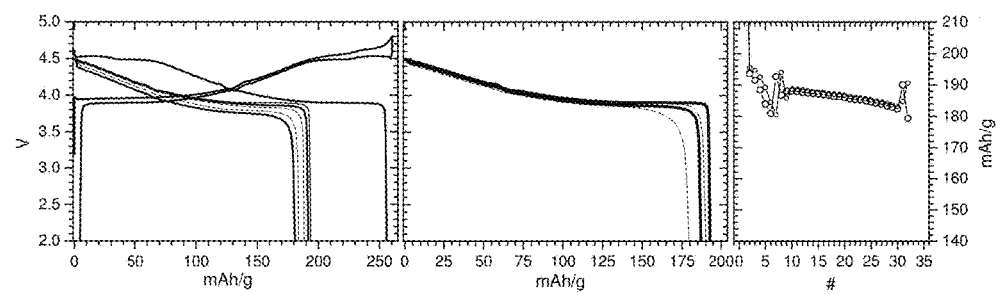

FIGS. 3A-C illustrates the electrochemical testing of high voltage stable $LiCoO_2$ for:
(A) first cycle 4.3V
(B) first cycle 4.6V
(C) first cycle 4.8V.

For each of FIGS. 3(A), 3(B) and 3(C) the left figure shows cycles 1-6 (from right to left), the middle cycles 7, 8, 31 & 32 (from right to left). The right figures show the fade rate: capacity in mAh/g against cycle number (charge: small circles, discharge: bigger circles).

Example 4: Voltage Compatibility of LCO and HLM, and Compatibility of HLM-LCO Mixtures with Anodes A mixed transition metal hydroxide is obtained by conventional precipitation (metal sulfate with NaOH in the presence of ammonia). The metal composition is $M=Ni_{0.22}Mn_{0.66}Co_{0.11}$. The average particle size (D50 of the PSD) is about 3-4 μm, the precursor is consisting of relatively loose agglomerated sub-micrometer particles. The precursor has a low tap density of about 0.6 g/cm³. Final HLM type cathode material is prepared by mixing the precursor with $Li_2CO_3$ (Li: transition metal blend ratio=1.442, at this ratio it is assumed that Ni is divalent) and firing at 800° C. for 10 hours. The chemical formula of the final product is estimated as $Li_{1.181}Ni_{0.182}Mn_{0.546}Co_{0.091}O_2$. The surface area of the final sample is 4.5 m²/g. The morphology is "fluffy", meaning that the powder consists of loose agglomerates of sub-micrometer particles. These sub-micrometer particles have a size about 100 nm.

A high voltage stable $LiCoO_2$ based cathode is obtained from our pilot plant (made according to the process in WO2012-171780). The Li:Co ratio is 1.00 and the electrical conductivity of the LCO powder is below $10^{-4}$ S/cm². The LCO contains Mg (1 wt %). The majority of particles have a large size of 25 μm. The average particle size (D50 of the PSD) is 22 μm. The surface area of the $LiCoO_2$ based cathode is below 0.15 m²/g.

The $LiCoO_2$ and the HLM powder are mixed using different weight ratios:
Sample LCO:HLM
S4A: 90:10;
S4B: 75:25;
S4C: 50:50.

Coin cells are prepared and tested by the schedule used in Example 2(A) for testing HLM, here with is 1 activation cycle (N=1) at V1=4.6V followed by rate test and stability test at V2=4.5V (instead of 4.6V in Table 2.1). Table 4.1 summarizes the obtained results.

TABLE 4.1

Coin cell testing of mixtures of HLM and high voltage stable LCO.

| | Coin Cell Schedule: V1 = 4.6V, V2 = 4.5V | | | | | Fading rate (per 100 cyc) | | | |
|---|---|---|---|---|---|---|---|---|---|
| | DC Q | Qirr | DC Q | 1 C Rate | 3 C Rate | Capacity | | Energy | |
| Sample | mAh/g | % | 0.1 C | %/0.1 C | %/0.1 C | 0.1 C | 1 C | 0.1 C | 1 C |
| S4A | 234.6 | 3.8 | 196.8 | 95.6 | 90.6 | 6.5 | 12.3 | 7.5 | 14.1 |
| S4B | 232.5 | 5.9 | 194.8 | 93.8 | 88.3 | 10.1 | 16.1 | 12.1 | 19.7 |
| S4C | 239.3 | 7.6 | 201.2 | 90.5 | 84.2 | 14.5 | 19.0 | 17.4 | 25.0 |

Figure 4A:
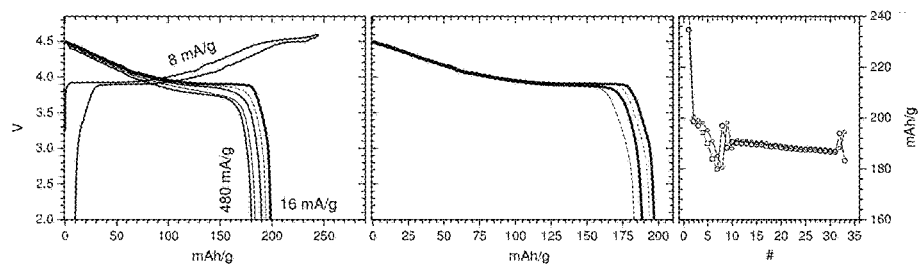
FIGS. 4A, 4B, 4C: Coin cell testing of mixtures of HLM and high voltage stable $LiCoO_2$
Figure 4B:
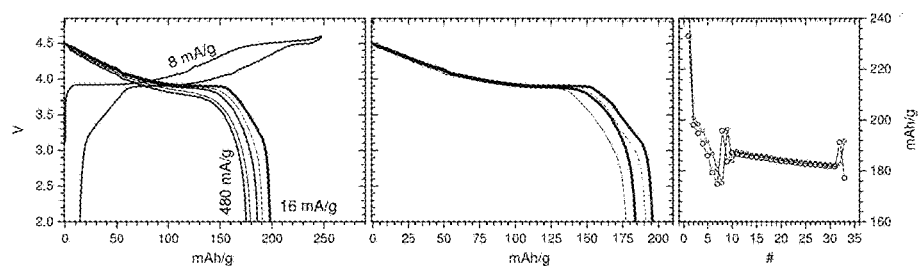
Figure 4C:
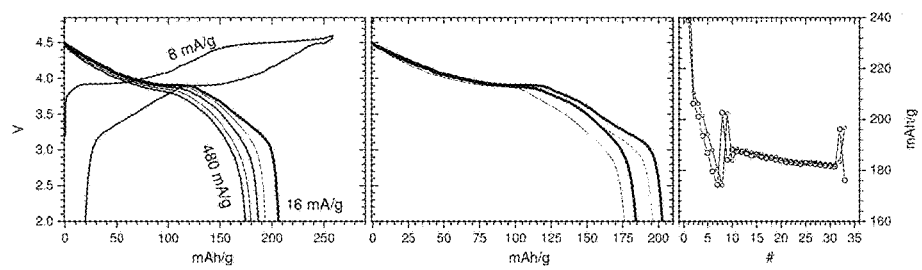

FIGS. 4A, 4B, and 4C summarize the coin cell testing details. (A=S4A, . . . ). For each of FIGS. 4(A), 4(B) and 4(C) the left figure shows cycles 2-7 (from right to left), the middle cycles 8, 9, 32 & 33 (from right to left). The right figures show the fade rate: capacity in mAh/g against cycle number (charge: small circles, discharge: bigger circles).

Usually, the properties of 100% LCO do not match real anodes well. 100% $LiCoO_2$ has a too high charge efficiency (near to 98.5%) and a high rate performance at 3 C rate (91.5%).

At the same time 100% HLM, compared with typical anodes, has a low charge efficiency (<90%) and a low rate performance. Therefore also HLM does not match well with a typical anode. In the invention, mixtures match well with real anodes, and a sufficient high cycling stability is achieved. The region between Sample S4A and S4B corresponding to 10-25% HLM shows particular promising properties since an optimum highest density coincides with higher capacity, slightly lower rate and increased irreversible capacity when comparing with 100% $LiCoO_2$. The Example illustrates that the voltage window of (cobalt doped) HLM and $LiCoO_2$ are compatible and that a mixture of $LiCoO_2$ and HLM matches much better to real anodes in terms of charge efficiency and rate performance than either HLM or $LiCoO_2$. At 4.5V about or more than 195 mAh/g capacity can be achieved.

Example 5: $LiCoO_2$ Based Electrodes with Little or no Liquid Electrolyte

Figure 5:
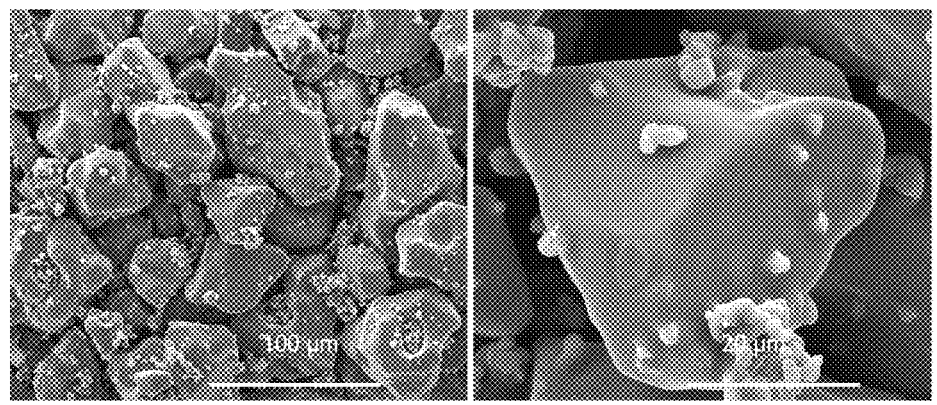
FIG. 5: typical SEM micrograph of dense high voltage $LiCoO_2$.

A high voltage stable $LiCoO_2$ is prepared by a double firing, as in WO2012-171780. The D50 of the particle size distribution is 50 μm which is consistent with the result of a PSD measurement. The particles are dense, with a pressed density of at least 4 g/cm$^3$ and a BET value ≤0.2 m$^2$/g. FIG. 5 shows a typical SEM micrograph of the $LiCoO_2$. Left: 1000× magnification. Right: relatively small particles located on surface of a larger 40 μm particle in larger magnification (5000×). Besides of a very small amount of fine particles the large particles are 100% dense with no open porosity.

Figure 6:
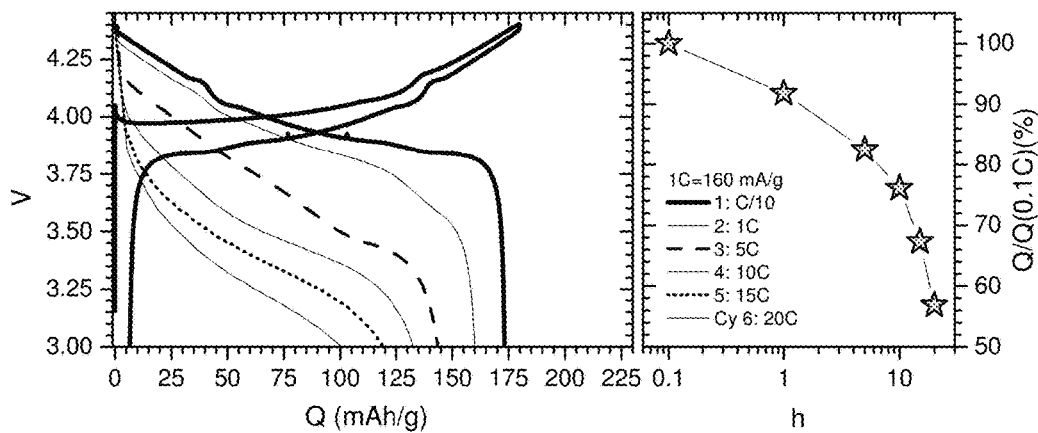
FIG. 6: Summary of coin cell testing of dense high voltage $LiCoO_2$.

Coin cells are prepared, wherein the electrode consists of 96 wt % of active material. The electrode loading is about 6 mg/cm$^2$. Table 5.1 lists the coin cell test results. FIG. 6 shows the electrochemical testing results: rate performance in thin electrode configuration: left Figure: from right to left Cycles 1 to 6, with corresponding rate: C/10, 1C, 5C, 10C, 15C, 20C; right figure: rate "% versus 0.1C" against "C rate" (in hour). A typical discharge rate for lithium batteries is a 1C rate. The high density, large particle $LiCoO_2$ demonstrate 92% at 1C rate, which is sufficient for practical applications. Alternatively, cells with 12 mg/cm$^2$ load were cycled with V1=4.3, V2=4.5V schedule described in Example 3 and showed very high cycle stability. Results are summarized in Table 5.2 and FIG. 7.

TABLE 5.1

Results of coin cell testing (4.4-3.0 V, 1 C = 160 mA/g)

| Cy 1(Charge) 0.1 C, mAh/g | Cy 1 (Disch) 0.1 C, mAh/g | Cy 2 (DisCh) 1.0 C, % | Cy 3 (DisCh) 5.0 C, % | Cy 4 (DisCh) 10 C, % |
|---|---|---|---|---|
| 180.7 | 175.7 | 91.8 | 82.4 | 76.2 |

The % value of the rate performance is obtained by dividing the discharge capacity of the cycle by the discharge capacity at a rate of 0.1 C.

TABLE 5.2

Results of coin cell testing (see schedule of Ex. 3, with V3.1 = 4.3 V, V3.2 = 4.5 V, 1 C = 160 mA/g)

| Q(C/10) mAh/g | Qirr % | rate (1 C) % | Fade (0.1 C) %/100 | Fade (1 C) %/100 | E Fade (0.1 C) %/100 | E Fade (1 C) %/100 |
|---|---|---|---|---|---|---|
| 158.6 | 4.17 | 90.5 | 8.2 | 8.4 | 8.2 | 11.4 |

Figure 7:
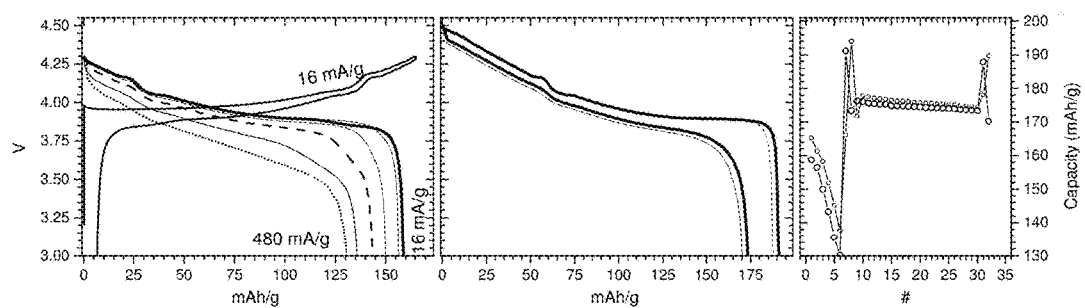
FIG. 7: Summary of coin cell testing (cycle stability) of 50 μm LCO.

FIG. 7 gives a summary of the coin cell testing results (cycle stability) of 50 μm LCO particles. The left figure shows cycles 1-6 (from right to left), the middle cycles 7, 8, 31 & 32 (from right to left), following the schedule used in Example3, with V3.1=4.3V, V3.2=4.5V. The right figures show the fade rate: capacity in mAh/g against cycle number (charge: small circles, discharge: bigger circles).

After the test the cell is disassembled and the particles in the electrode are analyzed by FESEM and XRD. FESEM shows that the particles remain dense, they do not shatter into pieces. XRD shows similar narrow peaks as before testing, proving that the crystal structure does not deteriorate. In general, as the particle size of dense compact particles increases, the rate performance of these materials decreases. This is because larger particles have a longer Li diffusion path length. Comparing Li diffusion path lengths is a useful tool to study the expected rate performance for different shaped particles or objects. A possible definition of the path length (diffusion length) is the average shortest distance of each Li atom in the particle to the surface. We can estimate the average solid diffusion path length of the large PSD LCO. If we assume that all particles are spheres of 50 μm diameter then the path length is the average of the distance from the surface R-r multiplied with the volume fraction. At position r the volume traction is $4\pi r^2/Vol$ where $Vol=4/3\pi R^3$. Integrating over the sphere all distances multiplied by the volume fraction gives $$\frac{3}{R^3}\int_0^{R=25\,\mu m} dr(R-r)r^2 = \left(\frac{R}{4}\right) = 6.25\,\mu m$$

A flat, dense (plate type) electrode of 12.5 μm thickness has the same average diffusion length, so it should exhibit roughly a similar rate performance. With a density of 5.05 g/cm³ for LiCoO₂ the cathode loading of the plate type electrode is 6.3 mg. Hence we estimate the rate performance of a liquid free electrode plate as >90% at 1C rate for 6.3 mg/cm² loading. 6.3 mg/cm² loading is less than the 15 mg/cm² loading for typical state of art lithium batteries. Otherwise, the powder requirement for a solid cathode can be less. We can use the diffusion length L defined as $L^2 = 2d$ Dt by using the relation $$t \propto \frac{L^2}{D}$$

where L is the diffusion length and D the diffusion constant to estimate the change of rate performance for different thick electrodes if we know the rate for a given thickness. For a 20 mg/cm² dense electrode plate using the 10C rate performance of Table 5.1 we obtain a 1C rate performance of about 75%. In theory even thicker plate electrodes could be utilized because the solid diffusion does not show the rate limiting effects (electrolyte shut-down) known for binary electrolytes.

To summarize: The solid diffusion constant of high voltage LiCoO₂ is sufficiently high to allow for liquid electrolyte free electrodes. In mixed electrodes (for example HLM+ LiCoO₂) the large LiCoO₂ particles can act as solid diffusion short-cuts between 2 regions with HLM particles, thus dramatically reducing the required amount of liquid electrolyte. Such electrodes will have extremely good safety properties. The example clearly demonstrates that electrodes with very low or even zero content of liquid electrolyte can have sufficient power.

Example 6: Low Porosity Electrode

The example will demonstrate low porosity electrodes. The large particle LiCoO₂ (50 μm size) of Example 5 and the HLM of Example 4 are used. Slurries for coating are prepared from mixtures of LCO and HLM. As conductive additive super P is used, as binder and solvent a 5% PVDF in NMP solution is used. Table 6.1 summarizes the slurry composition. A part of the slurries are coated on Al foil as a thick film, dried, pealed off, and grinded to obtain electrode powder. The electrode powder density is measured on pressed pellets. Generally the electrode powder density is a very good approximation for a real electrode density which can be obtained with the powder. The diameter of the pressed pellets is 1.311 cm and the mass is 3.0 g, the applied force is 207 MPa. The obtained pellet density values are 4.153 g/cm³ (5% FILM); 4.036 g/cm³ (10% HLM) and 4.123 g/cm³ (15% HLM). Use of the true density of LiCoO₂ (5.05 g/cm³), HLM (4.251 g/cm³), PVDF (1.7 g/cm³) and carbon (2 g/cm³) allows to calculate the porosity. The result is 11.3%; 11.6% and 7.6%. These data show that electrodes with very low porosities can be achieved. The porosities are much less than the critical porosities calculated below in Example 8. Typical electrode porosities in commercial cells are >12%, often 15-20%.

The remaining slurry is used to coat electrodes of high loading followed by drying and compacting. The active cathode load is 58, 50 and 45 mg/cm². These loads are very high, 3-4 times larger than normal electrodes in commercial cells. Coin cell testing shows full capacity within 1-2% of expected value when tested at C/20 rate. The reference value is obtained for 3.0-4.3V with 12 mg/cm² electrodes at C/10 rate, 1C=160 mA/g and is similar to the theoretically expected value (average of LCO and HLM capacity). During further cycling of the cells with thick electrodes the electrodes pealed peeled off, known current coating technology is not optimized to obtain stable cycling with very high load. However the Example demonstrates that very thick electrodes with low porosity, promising excellent safety can be reversible cycled.

TABLE 6.1

Electrode making using mixtures of fluffy HLM and 50 μm LCO

| HLM % | PVDF sol g | Carbon g | HLM g | LCO g | Solid % | active % |
|---|---|---|---|---|---|---|
| 5 | 12.377 | 0.619 | 1.5 | 28.5 | 72.7 | 96.04 |
| 10 | 15.231 | 0.762 | 3 | 27 | 68.5 | 95.17 |
| 15 | 15.115 | 0.756 | 3.75 | 21.25 | 64.9 | 94.30 |

Example 7: High Safety if Less Electrolyte Present

This example demonstrates the absence of a major exothermic reaction of delithiated cathodes when no electrolyte is present. For this experiment commercial LiMO₂ with M=Ni₀.₅Mn₀.₃Co₀.₂ is used as model material. Coin cells (with small positive electrodes (cathode) and Li metal anode) are prepared and charged to 4.3V. Cathode active material weight is about 3 mg. The coin cells are opened, thereby paying attention not to short circuit the cell. The electrode is washed in DMC, then dried at 120° C. for 10 min in air.

The dried electrode is inserted in a stainless steel DSC cell and a defined amount of electrolyte is added. In this Example, 1.1 mg electrolyte is added in one experiment, in the other experiment no electrolyte is added. Then the cells are hermetically sealed. The exothermic heat is measured during heating to 350° C. at a rate of 5 K/min. The mass of the DSC cell is checked before and after measurement to ensure that the DSC cell does not leak.

Figure 8:
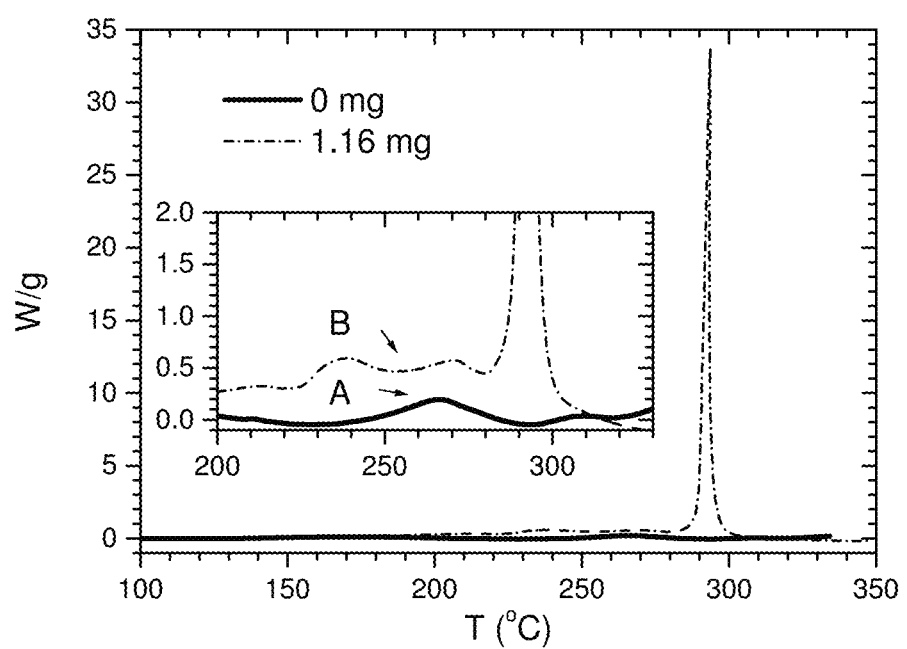
FIG. 8: Result of DSC measurement of charged electrodes (a) without and (b) with 1.16 mg of electrolyte added

FIG. 8 compares the result of DSC measurements of charged electrodes (A) without and (B) with 1.16 mg of electrolyte added. The measurement shows the typical strong exothermic event at about 290° C. where charged cathode and electrolyte start a violent reaction. However, in the absence of electrolyte almost no heat evolution is observed. At first glance this result—the absence of an exothermic event—is a surprise since delithiated Li₀.₄MO₂ is thermodynamically highly unstable. This is because during the charging process (reaction 1 below) the extraction of Li requires a large amount of energy (at 4.3V about 3.7V× 170 mAh/g). Then, during heating the cathode collapses and releases oxygen (reaction 2 below). At first glance it can be expect that the reaction 2) from unstable compounds to stable compounds is strongly exothermic. So the result (small exothermic heat for 2)) appears surprising. But if we look at the whole thermodynamic cycle by adding reaction 3) we can understand that reaction 2) does not evolve much exothermic heat.

Charge: stable→unstable: $LiMO_2 \rightarrow Li_{0.4}MO_2 + 0.6Li$    1)

Cathode collapse: unstable→stable:
$Li_{0.4}MO_2 \rightarrow 0.4LiMO_2 + 0.3M_2O_3 + 0.15O_2$    2)

Complete the cycle: $0.4LiMO_2 + 0.3M_2O_3 + 0.15O_2 + 0.6Li \rightarrow LiMO_2$  (3)

We can split reaction 3) into 2 reactions:

$0.6Li + 0.15O_2 \rightarrow 0.3Li_2O$ (strong exotherm)  (3a)

$0.3Li_2O + 0.3M_2O_3 \rightarrow 0.6LiMO_2$  (3b)

In these reactions only 3a) is strongly exotherm (Li burns with the evolution of lots of heat). None of the other reactions 1), 3b) is strongly endotherm: In reaction 1) $\Delta H_1$ is near zero because a battery does not change much in temperature when charged or discharged. In reaction 3b) $\Delta H_{3b}$ is near zero because generally the creation of double oxides from simple oxides does not create or consume much heat. Therefore reaction 2) cannot be strongly exotherm, because in a thermodynamic cycle the sum of the formation enthalpies adds up to zero: $0 = \Delta H_1 + \Delta H_2 + \Delta H_{3a} \Delta H_{3b}$. If however, reaction 2) is not strong exotherm, then no heat evolves during cathode collapse and the battery does not self-heat and does not go into thermal runaway. In the presence of electrolyte however, the situation is different, because the cathode collapse occurs simultaneously with the very exothermic combustion of electrolyte. It can be concluded that reducing the electrolyte: active mass ratio allows to improve the safety of real batteries.

Example 8: Improved Safety by Lowering the Electrolyte: Cathode Ratio

Charged Li batteries are potentially unsafe. In the worst case scenario the delithiated cathode and the lithiated anode react with the electrolyte, causing a thermal runaway. The major contribution to the exothermic heat is the electrolyte oxidation: the charged cathode can release oxygen which combusts the electrolyte. If we assume that x in equation (4) (of the CCE reaction described before) is 0.5, then 1 mol charged $Li_{0.5}CoO_2$ can combust 0.1 mol $C_3H_4O_3$ (ethylene carbonate (EC) based electrolyte). We can estimate how much electrolyte can be combusted by the oxygen released from the cathode. We assume x=0.5, and for simplicity we use EC to represent the electrolyte.

1 mol $LiCoO_2$=97.9 g
0.1 mol $C_3H_4O_3$=8.8 g

The electrolyte: cathode mass ratio which allows for 100% combustion is about 9 percent (8.8/97.9≅0.09, theoretically for x=1 this would be 18%). The result is that the safety of a battery can be improved if much less than about 9% by weight of electrolyte relative to the active cathode is added to a battery. If less electrolyte is present, then less electrolyte combusts and the thermal safety will improve.

The electrolyte fills the pores in the electrodes. The pores must be filled with electrolyte otherwise the battery will have a poor performance. For simplicity—lets assume that ½ of the electrolyte is in the pores of the cathode (this is achieved for example if cathode and anode have the same thickness and same porosity). Lets furthermore assume that the separator is thin, so we can neglect its porosity, and lets assume that the electrolyte exactly fills the porosity, meaning no "leftover" electrolyte is present in the battery after assembly. The critical porosity is the porosity which—when filled with electrolyte—corresponds to a ratio of electrolyte to cathode active material of 9 wt %. Using these assumptions together with the densities of cathode and electrolyte we can estimate a critical porosity as follows:

$LiCoO_2$: Density 5.05 g/cm³
Typical electrode composition: $LiCoO_2$: 96 wt % (2% Binder (1.77 g/cm³), 2% carbon (2 g/cm³))→electrode theoretical density (0% porosity)=4.92 g/cm³

$C_3H_4O_3$: Density 1.32 g/cm³

Electrolyte: 9% (by weight, per mass of cathode) present in the battery, of those 9% ½ (=4.5%) present in the cathode.

Using these data allows to calculate the critical porosity as 13.7% (in volume), knowing that vol1=vol electrode=1/(0.96*4.92)=0.214; vol2=vol electrolyte=0.045/1.32=0.034; and porosity=vol2/(vol1+vol2). The critical porosity increases with charge voltage. The high voltage stable cathodes allow for reversible cycling at >4.5V. At 4.5V we achieve a reversible capacity of >185 mAh/g (the total charge being 280mAh per gram when all Li is extracted). This corresponds to x>0.675 in the 4.5V charged $Li_{1-x}CoO_2$, corresponding to a critical porosity of 20.5%. If the real cathode porosity is further decreased or if x is increased (more lithium extracted at full charge by charging at a higher voltage) then we can assume that the safety of a battery having a certain capacity improves. The example shows that electrodes with small porosity allow to reduce the electrolyte sufficiently to achieve improved safety.

Example 9

A $LiCoO_2$ with an average particle size (D50) in excess of 100 μm is prepared by using a large excess of lithium and sintering at high temperature. After sintering the excess Li is removed, resulting in a stoichiometric $LiCoO_2$, by performing the following steps:

firing a blend of $Li_2CO_3$ and $Co_3O_4$ (mol ratio Li:Co=1.2) at 990° C. for 12 h removing excess $Li_2CO_3$ by washing, followed by adding of more $Co_3O_4$ (about 6% Co per mol LiCoO2), and re-firing at 950° C. The particles of the final sample are dense "rock" shaped.

Figure 9:
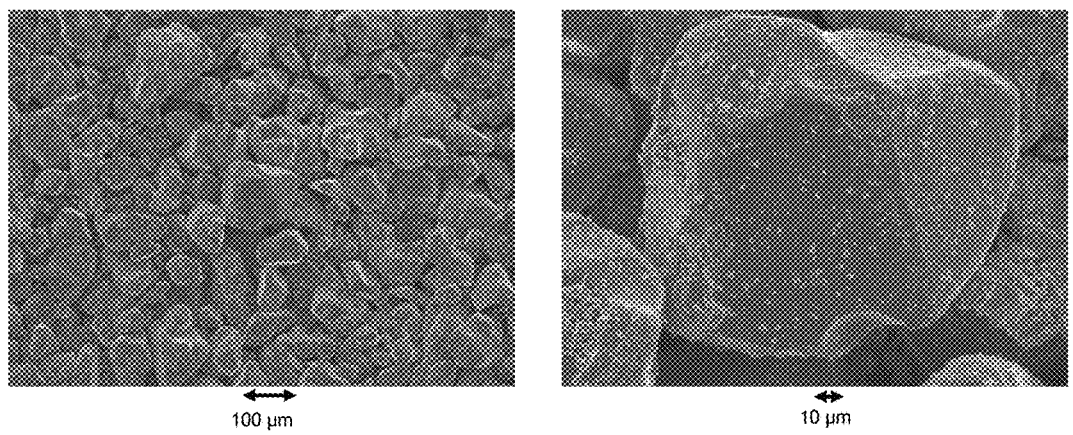
FIG. 9: Micrograph of the $LiCoO_2$ having a D50 of 100 micrometer

FIG. 9 shows a micrograph of the particles of the obtained powder.

Figure 10:
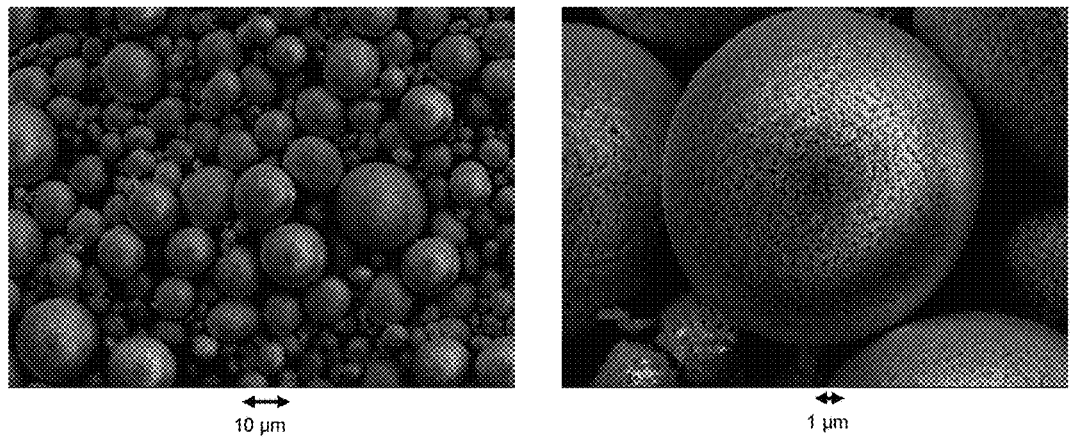
FIG. 10: Micrograph of the HLM cathode having a PSD D50 of 8 micrometer.

A Li and manganese rich cathode material—referred to as HLM—with composition $Li_{1+x}M_{1-x}O_2$ is prepared from a suitable $MCO_3$ precursor by mixing with $Li_2CO_3$ and firing in air at 800° C. The final composition has a Li:M ratio of about 1.42 and a transition metal composition M=$Mn_{0.67}Ni_{0.22}Co_{0.11}$. FIG. 10 shows a micrograph of the particles of the obtained powder. Note that the magnification in FIG. 10 is 10× that of FIG. 9.

The $LiCoO_2$ and HLM cathode powders are mixed. 3 mixtures are prepared containing 5, 10 and 20% by mass of HLM powder, labeled M05, M10, M15. The powder density is measured by compacting the pellets to a Density 1, then, after relaxing the pressure a Density 2 is measured. A very high density of 4.17 g/cm³ is measured for M10. This high density indicates that a very low porosity of 5 vol % or so can be achieved in real electrodes.

Figure 11:
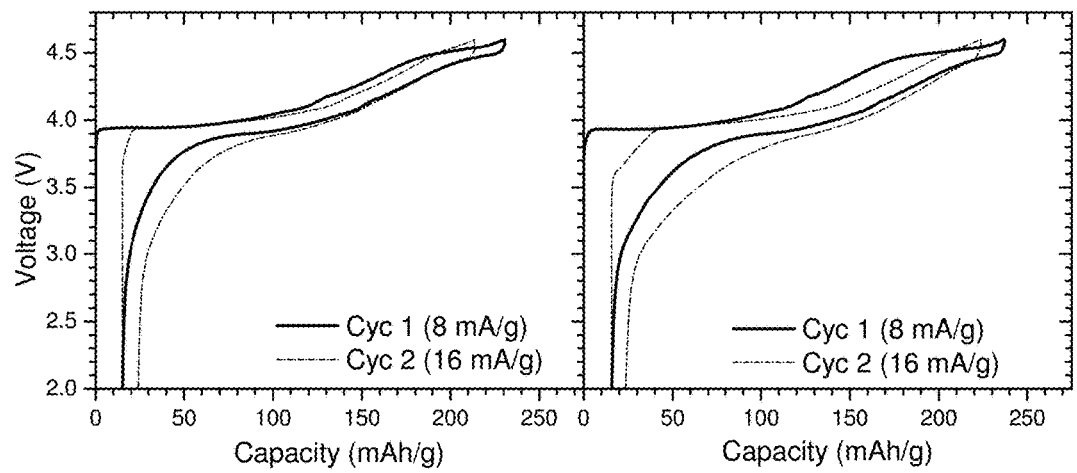
FIG. 11: Voltage profile of the sample M05 (left) and sample M20 (right) cycles at C/20 rate (cycle 1) and C/10 rate (cycle 2) between 4.6 and 2.0V at 25° C.

The mixtures are tested in Li coin cells. Coin cell are tested at a rate of C/20 (corresponding to a rate of 8 mA/g) between 2.0 and 4.6V. Cycle 2 is at C/10 rate (16 mA/g) between the same voltage limits. A very high reversible capacity is achieved, proving that even the very large and dense $LiCoO_2$ particles can cycle well. Table 9 summarizes the results. FIG. 11 shows the obtained voltage profiles.

TABLE 9

| Sample | LiCoO$_2$:HLM mass ratio | Q discharge mAh/g | Density1 g/cm$^3$ | Density2 g/cm$^3$ |
|---|---|---|---|---|
| M05 | 95:5 | 227.4 mAh/g | 4.30 | 4.17 |
| M10 | 90:10 | 230.7 mAh/g | 4.17 | 4.07 |
| M20 | 80:20 | 237.0 mAh/g | 3.97 | 3.89 |

Example 10

This example will demonstrate the improved safety of a cathode when less that than the critical amount of electrolyte is present. The example predicts that a cathode with a very low porosity—which only allows for less than the critical amount of electrolyte to be present—will provide improved safety.

The safety of sample M10 of Example 9 is estimated by a DSC measurement: 5 coin cells are prepared and charged at 25° C. to 4.5V at C/10 rate (16 mA/g). The obtained capacities are 197.2-197.8 mAh/g. The cells are disassembled directly after reaching the target voltage. The electrodes are washed in DMC to remove the electrolyte. After drying, small electrode discs with 3 mg of active material are inserted into DSC cells. 3 different types of DSC cells are prepared:

Cell type 1) No electrolyte is added, the cell is just crimped,

Cell type 2) about 2.6 mg of an electrolyte (ED/EMC) diluted 1:10 by DMC is added. After a few moments most of the DMC is evaporated, and the cell is crimped, Cell type 3) about 2.6 mg of electrolyte is added and the cell is crimped.

In this way DSC cells with a electrolyte:cathode ratio of (1) zero (being much lower than the critical ratio), (2) 0.08—being less than the critical ratio—and (3) 0.46—by far exceeding the critical ratio—are obtained.

The heat evolution is measured during heating at a rate of 5 K/min to 350° C.

Figure 12:
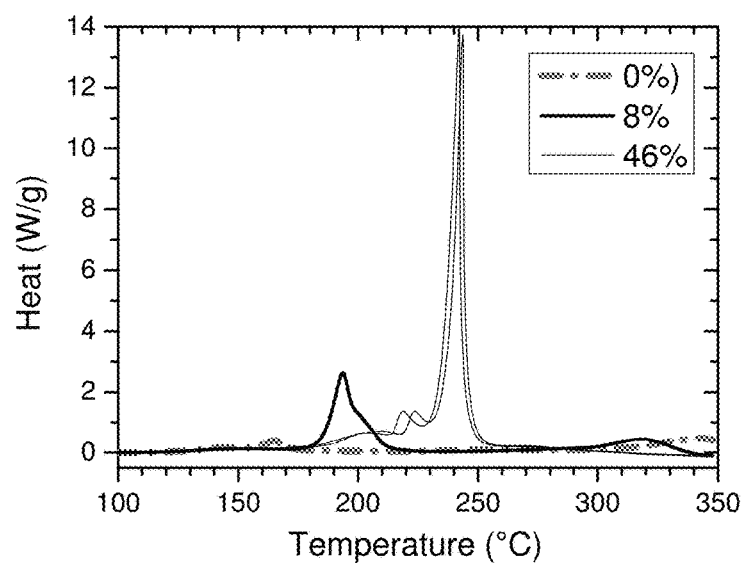
FIG. 12: DSC heat profiles of the (1) electrolyte free (2) 9% electrolyte containing and (3) 46% electrolyte containing electrodes.

Table 10 summarizes the obtained results. FIG. 12 shows the obtained DSC heat profiles. Clearly, as the amount of electrolyte decreases below the critical ratio the evolved heat decreases, thus the safety of a battery with a small amount of electrolyte will be high.

TABLE 10

| | 0% electrolyte | 8% electrolyte | 46% electrolyte |
|---|---|---|---|
| Integrated heat (kJ/g) cathode | 0.136 | 0.725 | 1.551 (1.601) |

It should be clear that the conclusions of the different examples embodying the invention are valid for undoped and doped LCO, the dopants being for example Mg, Ti, Fe, Cu, Ca, Ba, Y, Sn, Sb, Na, Zn, Zr, Si, Er, Nd and Nb.

The invention claimed is:

1. A bimodal lithium transition metal oxide based powder for a rechargeable battery, comprising:

a first lithium transition metal oxide based powder having an average particle size (D50) of at least 15 μm and comprising a material A, having a layered crystal structure comprising the elements Li, a metal M and oxygen, wherein the Li content is stoichiometrically controlled, wherein the metal M has a formula M=Co$_{1-a}$ M'$_a$, with 0≤a≤0.05, wherein M' is one or more metals selected from the group consisting of Al, Ga and B, and wherein the first lithium transition metal oxide based powder has an electrical conductivity of less than 10$^{-4}$ S/cm; and a second lithium transition metal oxide based powder having the formula Li$_{1+b}$N'$_{1-b}$O$_2$, wherein 0.10≤b≤0.25, and N'=Ni$_x$Mn$_y$Co$_z$A$_d$, wherein 0.15≤x≤0.30, 0.50≤y≤0.75, 0.05<z≤0.15 and 0≤d≤0.10, and wherein A is a dopant; wherein the second powder has an average particle size (D50) of less than 5 μm and wherein the ratio of the D50 value of the first powder to the D50 value of the second powder is at least 5:1.

2. A bimodal lithium transition metal oxide based powder for a rechargeable battery, comprising:

a first lithium transition metal oxide based powder having an average particle size (D50) of at least 15 μm and comprising a material B, having a core and a surface layer, wherein the core comprises a layered crystal structure comprising the elements Li, a metal M and oxygen, wherein the Li content is stoichiometrically controlled, wherein the metal M has a formula M=Co$_{1-a}$ M'$_a$, with 0≤a≤0.05, and wherein M' is one or more metals selected from the group consisting of Al, Ga and B; wherein the surface layer comprises a mixture of the elements of the core and inorganic N-based oxides, wherein N comprises one or more metals selected from the group consisting of Mg, Ti, Fe, Cu, Ca, Ba, Y, Sn, Sb, Na, Zn, Zr, Si, Nb, Mo, Ru, Rh, Pd, Ag, Cd, Sc, Ce, Pr, Nd, Gd, Dy, and Er, and wherein the first lithium transition metal oxide based powder has an electrical conductivity of less than 10$^{-4}$ S/cm; and a second lithium transition metal oxide based powder having the formula Li$_{1+b}$N'$_{1-b}$O$_2$, wherein 0.10≤b≤0.25, and N'=Ni$_x$Mn$_y$Co$_z$A$_d$, wherein 0.15≤x≤0.30, 0.50≤y≤0.75, 0.05≤z≤0.15 and 0≤d≤0.10, and wherein A is a dopant; wherein the second powder has an average particle size (D50) of less than 5 μm.

3. The bimodal lithium transition metal oxide based powder of claim 1, wherein the first lithium transition metal oxide based powder has a surface area measured by BET of less than 0.20 m$^2$/g, and the second lithium transition metal oxide based powder has a surface area measured by BET of at least 0.50 m$^2$/g.

4. The bimodal lithium transition metal oxide based powder of claim 2, wherein the ratio of the weight fraction of the first lithium transition metal oxide based powder to the weight fraction of the second lithium transition metal oxide based powder is at least 2:1.

5. The bimodal lithium transition metal oxide based powder of claim 2, wherein the first lithium transition metal oxide based powder has an electrical conductivity of less than 10'S/cm, measured under a pressure of 63.7 MPa.

6. A positive electrode for a rechargeable battery, comprising the bimodal lithium transition metal oxide based powder of claim 1, and having a porosity ≤15%.

7. A rechargeable battery comprising the positive electrode of claim 6, wherein less than 15 vol % of organic electrolyte fills pores of the positive electrode.

8. The rechargeable battery of claim 7, wherein the total mass of electrolyte per mass of positive electrode is less than 15%.

9. The bimodal lithium transition metal oxide based powder of claim 2, wherein the first lithium transition metal oxide based powder comprises large dense particles having a D50 of at least 15 μm, and wherein the ratio of the D50 value of the first lithium transition metal oxide based powder to the D50 value of the second lithium transition metal oxide based powder is at least 3:1.

10. The bimodal lithium transition metal oxide based powder of claim 2, wherein the first lithium transition metal oxide based powder has a surface area measured by BET of less than 0.20 m$^2$/g, and the second lithium transition metal oxide based powder has a surface area measured by BET of at least 0.50 m$^2$/g.

11. A positive electrode for a rechargeable battery, comprising the bimodal lithium transition metal oxide based powder of claim 2, and having a porosity ≤15%.

12. A rechargeable battery comprising the positive electrode of claim 11, wherein less than 15 vol % of organic electrolyte fills pores of the positive electrode.

* * * * *